(12) United States Patent
Zhang (10) Patent No.: US 10,367,389 B2
(45) Date of Patent: Jul. 30, 2019

(54) INTELLIGENTLY CONTROLLED VARIABLE POWER MOTOR

(71) Applicant: Shixing Zhang, Beijing (CN)

(72) Inventor: Shixing Zhang, Beijing (CN)

( * ) Notice: Subject to any disclaimer, the term of this patent is extended or adjusted under 35 U.S.C. 154(b) by 0 days.

(21) Appl. No.: 16/240,718

(22) Filed: Jan. 5, 2019

(65) Prior Publication Data

US 2019/0199157 A1    Jun. 27, 2019

Related U.S. Application Data

(63) Continuation of application No. PCT/CN2017/000421, filed on Jul. 5, 2017.

(30) Foreign Application Priority Data

Jul. 7, 2016  (CN) .......................... 2016 1 0527604

(51) Int. Cl.
| | |
|---|---|
| *H02K 7/06* | (2006.01) |
| *H02K 3/28* | (2006.01) |
| *H02K 17/12* | (2006.01) |
| *H02K 17/04* | (2006.01) |
| *H02K 11/33* | (2016.01) |

(52) U.S. Cl.
CPC .............. *H02K 3/28* (2013.01); *H02K 11/33* (2016.01); *H02K 17/04* (2013.01); *H02K 17/12* (2013.01)

(58) Field of Classification Search
CPC .......... H02K 3/28; H02K 11/33; H02K 11/38; H02K 17/04; H02K 17/06; H02P 1/00; H02P 25/18

USPC ....... 310/179–180, 184, 189, 191, 198, 200, 310/310; 318/497, 318
See application file for complete search history.

(56) References Cited

U.S. PATENT DOCUMENTS

| | | | | |
|---|---|---|---|---|
| 4,697,132 A * | 9/1987 | Ronk | ......................... | H02P 1/26 318/794 |
| 5,231,338 A * | 7/1993 | Bulgarelli | ................. | H02P 6/18 318/400.04 |
| 6,791,226 B1 * | 9/2004 | Dhawan | ................... | H02K 3/28 310/179 |
| 7,417,394 B2 * | 8/2008 | Bay | ........................ | G01R 31/42 318/434 |

(Continued)

FOREIGN PATENT DOCUMENTS

| | | |
|---|---|---|
| CN | 2243138 Y | 12/1996 |
| CN | 1641972 A | 7/2005 |

(Continued)

*Primary Examiner* — Thanh Lam
(74) *Attorney, Agent, or Firm* — Wayne & Ken, LLC; Tony Hom (57) ABSTRACT

Disclosed are a variable power motor and an intelligent controller therefor. The motor includes a rotor, a stator, a housing, stator windings and terminals. The stator windings are formed by embedding the same stator core into multiple series windings. Various series nodes of the stator windings, each serving as a power supply terminal with different power, are respectively led out individually. The various series windings of the stator respectively control, by means of the intelligent controller, the switching on and off of multiple switching switches. The soft-start and soft-stop of the motor can be realized, and a load is automatically tracked to regulate the power of the winding during operation, so as to obtain a power-saving effect.

7 Claims, 6 Drawing Sheets

(56) References Cited

U.S. PATENT DOCUMENTS

2002/0084705 A1\* 7/2002 Kawamura ........ H02K 11/0094
310/68 R
2014/0217946 A1\* 8/2014 Kume ................... H02P 25/188
318/497

FOREIGN PATENT DOCUMENTS

| CN | 101136572 A | 3/2008 |
|---|---|---|
| CN | 101777867 A | 7/2010 |
| CN | 201639543 U | 11/2010 |
| CN | 202004604 U | 10/2011 |
| CN | 102255436 A | 11/2011 |
| CN | 103647497 A | 3/2014 |

\* cited by examiner

INTELLIGENTLY CONTROLLED VARIABLE POWER MOTOR

CROSS-REFERENCE TO RELATED APPLICATIONS

This application is a continuation of International Application No. PCT/CN2017/000421, filed on Jul. 5, 2017, which claims priority from Chinese Patent Application No. 201610527604.0, filed on Jul. 7, 2016, both of which are hereby incorporated by reference in their entireties.

TECHNICAL FIELD

The invention relates to the technical field of motor manufacturing and motor control.

BACKGROUND OF THE PRESENT INVENTION

The squirrel-cage asynchronous motor is the most widely used electrical equipment which consumes the most power. Although the motor has the advantages of low cost, simple structure and reliable operation, it can only be started at full voltage without using auxiliary starting equipment, and the starting current is large. The operating efficiency and power factor are low under light load, the power of the motor is not variable as the load changes, and the waste of electric energy is serious under light load and no load.

In the known motor manufacturing technology and published patents related to motor manufacturing methods, although there are plans to change the number of poles and power supply voltage to change the rated capacity, the range of modification is large, the technical difficulty is high, and the cost required is high, thus affecting the promotion and use. Therefore, in order to reduce the starting current of the motor, it is necessary to adopt the star-delta starting mode or autotransformer step-down starting mode.

The star-delta starting mode is generally only applicable to motors with smaller power. Although the starting mode of an autotransformer step-down starter can be applied to motors with larger power, the autotransformer step-down starter has large size, large power consumption, high comprehensive cost and waste of copper, silicon steel sheets and insulating materials. It can only be used in the starting process of motors and cannot meet the requirements of low carbon and energy saving.

With the development of high-power semiconductor technology, phase-controlled power saver, soft-starter and frequency converter with power semiconductor elements have appeared. However, they are high in cost and price, and are only suitable for pumps, fans and other variable speed loads, which limit their popularization and use. The use of phase-controlled power saver, soft-starter or frequency converter is easy to produce more harmonic interference, leading to deterioration of the quality of the power supply, which is very harmful to the power supply and is difficult to deal with.

CN2243138Y discloses a variable capacity three-phase asynchronous motor which changes the rated capacity of the motor by changing the wiring mode of the stator winding. It starts in a small capacity mode upon starting, runs in a large capacity mode when the load is heavy, and runs in a small capacity mode when the load is light, thus improving the efficiency and power factor of the motor under different loads and achieving the purpose of saving electric energy. However, the number of windings in this method is small, the use efficiency of the windings is low, and the continuous regulation performance of starting or running current thereof is low. Therefore, its regulation accuracy and range are limited.

CN1641972A discloses a self-variable power motor which although has the characteristic of power saving of self-variable power, is cumbersome to manufacture and needs to be internally connected with a larger capacitor for phase shifting, thus its implementation on high-power motors is limited and the large current impact in the starting process is not solved. Therefore, it is not conducive to wide popularization and use.

CN101136572A discloses a double winding asynchronous motor. In order to solve the high cost of AC frequency conversion and speed regulation of the motor, a low-cost double-winding asynchronous motor scheme is provided. However, due to the large change of its windings, a power semiconductor element is also required for control, which is easy to generate harmonic interference. In addition, the double winding asynchronous motor only has a speed regulation range of 50%~100%, thus it does not have obvious advantages and popularization value.

To sum up, in the previous power saving methods of motors, due to the large jump magnitude of the starting characteristics, the precision of power-saving regulation in operation is limited, the wiring of the motors is complex, and the cost is high, which is not conducive to wide-range popularization.

SUMMARY OF THE PRESENT INVENTION

The invention aims to provide an intelligently controlled variable power motor including a variable power motor and an intelligent controller. Under the condition that an iron core structure of a common motor is not greatly changed, the intelligent controller switches on and off leading-out terminals of respective three-phase or multi-phase nodes of multiple stages of stator series windings n of the variable power motor, so that the motor not only has soft-start and soft-stop functions, but also has a power saving function of automatically adjusting a working current according to load changes, allowing the series variable power motor and the intelligent controller to form an organic drag and control system. The intelligent controller controls and switches the multiple stages of series windings L of the variable power motor according to signals of load sensors I1, I2 and V1 in a timely manner, thereby sufficiently improving the operation efficiency and power factor of the variable power motor to achieve the purposes of energy saving, soft-start and soft-stop of the motor.

The multiple stages of stator windings L of the variable power motor are connected in segmented series stage by stage from a star point o to the outside according to the magnitude of power of the windings, and the windings near the star point o are series windings L1 having the maximum power. The series windings L1 are each connected at one end to form the so-called star point o, the other ends of the series windings L1 are each connected to one end of a respective one of the next-stage series windings L2 with a power only second to the maximum power, while the other ends of the series windings L2 are each connected to one end of a respective one of their next-stage series windings L3, and so on, until open ends of the series windings Ln with the minimum power are the leading-out terminals of the minimum power.

The stator windings L of the variable power motor are in the form of series windings whose powers are gradually reduced stage by stage according to the rated current Ir of the motor, and series nodes L1, L2, L3 . . . Ln of the respective stator series windings L are led out to the terminals U1, V1, W1; U2, V2, W2; U3, V3, W3 . . . Un, Vn, Wn, and then the intelligent controller automatically switches and controls the respective series nodes L1, L2, L3 . . . Ln of the multiple stages of series windings L; the maximum rated current of the stator series windings L is the rated current Ir of the motor, i.e. the rated current of the series windings L1 near the star point, and rated currents Ir1 to Irn of respective stator series windings L are respectively selected according to geometric progression, arithmetic progression or other discrete parameters of the rated currents Ir to complete the optimization of respective rated current Ir1 to Irn of the multiple stages of series windings L.

The stator windings of the variable power motor are formed by embedding multiple stages of stator series windings L in the same stator core slot. The multiple stages of stator series windings L are connected in segmented series stage by stage from the star point o to the outside according to the magnitude of power of the windings, and the windings near the star point o are series windings having the maximum power. Said series windings are each connected at one end to form the so-called star point o, the other ends of said series windings are each connected to one end of a respective one of the next-stage series windings with a power only second to the maximum power, while the other ends of the next-stage series windings with a power only second to the maximum power are each connected to one end of a respective one of their next-stage series windings with a power only second to the power thereof, and so on, until open ends of the series windings Ln with the minimum power are the leading-out terminals of the minimum power; series nodes of the series windings L1 with the maximum power near the star point o and their next-stage series windings L2 with the power only second to the maximum power serve as the leading-out terminals of the maximum power, and so on; and then leading-out terminals of the next-stage power only second to the maximum power are led out at the nodes of respective series windings, then the leading-out terminals of the still next-stage power, until the leading-out terminals Ln of the open ends of the series windings with the minimum power.

Leading-out terminals of the respective nodes L1, L2, L3 . . . Ln of the multiple stages of stator series windings L of the variable power motor of the present invention are respectively led out according to the rated currents Ir1, Ir2, Ir3 to Irn of different magnitudes, and the series windings Ln with the minimum power are the leading-out terminals of the open ends of the series windings. The rated currents Irn or rated powers of the variable power motor led out by respective leading-out terminals can be controlled to increase gradually from small to large by the intelligent controller to realize the soft-start of the motor, and be controlled to decrease gradually from large to small to realize the soft-stop of the motor. Appropriate series windings can be switched in real time by the intelligent controller according to the load sensing signal, so that the real variable power motor can automatically change the power regulation characteristics and excellent energy saving effect in tracking the load change. The real-time switching of the appropriate series windings by the variable power motor according to the load can be realized by the intelligent controller by performing a comparison operation according to load sensing signals, thus the variable power motor can realize the regulation characteristic of automatically changing the power in tracking the load change and has excellent power-saving effect.

The stator series windings L of the variable power motor adopts a multi-stage segmented intelligent control, the nodes of each stage outward from the star point o can be each regarded as a three-phase motor with independent power, until a three-phase motor with the minimum power at the open end, and the motor power of each stage is increased by a certain amount from the open end to the center star point o; and the series windings near the star point o are always in working state after the motor is turned on, but the working current of each stage varies with the change of the following stages, until the final windings Ln with the minimum power.

According to the variable power motor disclosed by the invention, leading-out terminals of the series nodes of each stage of the three-phase series windings and the next stage of the three-phase series windings correspond respectively to multiple three-phase switching switches m1 to mn, so that soft-start and soft-stop are realized, and the rated currents Ir1 to Irn of the multiple stages of series windings L are automatically regulated by tracking load changes in operation, thereby obtaining dynamic regulation characteristics and higher power-saving effect.

According to the variable power motor of the invention, the advantages of adopting a staging control of the multiple stages of stator series windings L lie in that the utilization rate of the multiple stages of stator series windings L is higher, the process efficiency is improved, and the volume and area of slot of the stator core is fully utilized. The series windings near the star point o are always in working state after the motor is turned on, but the working current of each stage varies with the change of the following stages, i.e. the series windings near the star point are controlled by the following stage of series windings, until the final stage of windings with the minimum power. The mathematical optimization method of the multiple stator series windings L of the variable power motor is suitable for single-phase or multi-phase motors.

The intelligent controller of the variable power motor according to the present invention controls the switching on and off of the switching switches m of the multiple series windings after mathematical analysis according to the magnitude of signals of a load current sensor I2 or I1, that is, the magnitude of the load.

The multi-stage winding switching switches m and multiple power factor compensation switching switches K correspond to the leading-out nodes of the multiple stages of stator series windings L one by one, the number of terms of the multiple stages of stator series windings L is equal to the number n of terms of a sequence, the number n of the multiple stages of stator series windings L is equal to the number of the multiple winding switching switches m or the number of the multiple power factor compensation switching switches K, and therefore, the number n of the multiple stages of stator series windings L is also the number n of the sequence, wherein a first-stage stator winding L1 is a first term a1 of the sequence, a second-stage stator winding L2 is a second term a2 of the sequence, a third-stage stator winding L3 is a third term a3 of the sequence, and a n-stage stator winding Ln is the last term an of the sequence.

The variable power motor and the intelligent controller of the present invention form a self-contained system and thus do not need to use high-current semiconductor elements, have the advantages of low cost, high performance, no electromagnetic harmonic pollution and environmental protection, and can be extensively employed to replace the star-angle starter, autotransformer step-down starter, soft-starter, frequency converter, etc.

In order to give full play to the power regulation characteristics of the variable power motor, the intelligent controller of the present invention adopts an electronic control system using a single-chip microcomputer IC1 as a control core, and the electronic control system comprises a load current detection, a display, a keyboard, multiple switching switches m and a driving circuit.

The intelligent controller has at least one group which controls switching of multiple three-phase power switches according to current signals of the load current sensor I2. The automatic switching control is performed by the IC1 by running a software program stored in its program memory to automatically output switching control signals, and then the multiple switching switches m complete switching of the multiple three-phase series windings n of the multi-stages variable power motor and realize the power-saving operation, so that the power-saving motor automatically switches to the low-current windings when the motor is under light load, allowing it to be matched with the load current. By reducing the magnetic flux density of the motor core, the core loss is reduced, the heat generation is reduced, the temperature rise is lowered, and the electric energy is saved, so that the variable power motor is always operated at the optimal efficiency and power factor. The operating program of the IC1 runs the program according to parameters such as the load current signals, the rated currents of the multiple three-phase series windings n of the variable power motor, etc., and issues optimal switching commands of the multiple three-phase switching switches m through mathematical analysis and data processing, thereby realizing the characteristics of load current tracking and optimizing the motor efficiency.

According to the intelligently-controlled variable power motor, the intelligent controller also controls the switching on and off of the multiple power factor compensation switching switches K according to the power factor obtained by phase comparison operation of signals of the load current sensor I1 and a voltage sensor V1 and through the results of mathematical analysis, so as to realize efficient and economical operation and keep a higher power factor and efficient operation at all times during the operation of the motor.

According to the intelligently-controlled variable power motor, a phase difference $\varphi$ is obtained by detecting the phase of the load phase current and load phase voltage using the current and voltage signals output respectively by the current sensor I1 and the voltage sensors V1 in the intelligent controller, and the capacity of a compensation capacitor is selected depending on the reactive power component of the load. The intelligent controller issues switching commands of the multiple power factor compensation switching switches K through an output port according to the magnitude and positive and negative of the phase difference $\varphi$ obtained by operation, and finally the value of the phase difference $\varphi$ can be controlled to be around an ideal value of 0°.

DETAILED DESCRIPTION OF THE PRESENT INVENTION

In the following, a specific implementation is given below in conjunction with the accompanying drawings, which is only an example. In the implementation, there may be various specific embodiments to implement the principles and methods of the present invention.

Figure 1:
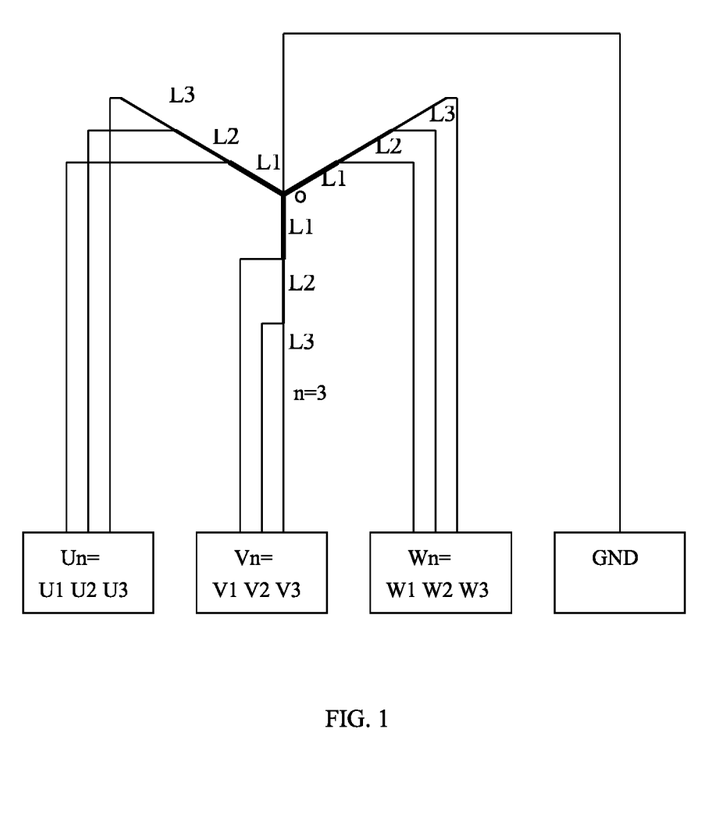
FIG. 1 is a schematic diagram of the distribution of multiple stator windings n of a variable power motor.

FIG. 1 shows a schematic distribution diagram of multiple three-phase series windings n (n=3) coupled by a star connection method of a multi-stage variable power motor, in which individual windings or multiple groups of parallel windings of an original motor are divided to form a segmented three-phase series winding motor with three stages. The number of turns, winding current and wire diameter of each stage of three-phase series windings are calculated according to the motor power of that stage of series windings. The windings are embedded in a stator slot of each phase, respectively. Then power supply terminals of the three three-phase series windings n of the multi-stage variable power motor are separately led out to the U1, U2, U3, V1, V2, V3 and W1, W2, W3 terminals of the three-stage variable power motor, and a star point o is commonly connected to a ground terminal GND. A ground terminal of the star point o may not be led out on the terminal GND.

Leading-out terminals of the series winding nodes of each phase are respectively connected to the terminals U1, U2, U3, V1, V2, V3, and W1, W2, W3 of the variable power motor, so as to control multiple three-phase switches m1, m2 to mn through the output of an intelligent controller to regulate the switching on and off of respective three-phase series windings, thereby realizing soft-start, soft-stop and dynamic power-saving and economic operation of the motor.

Figure 2:
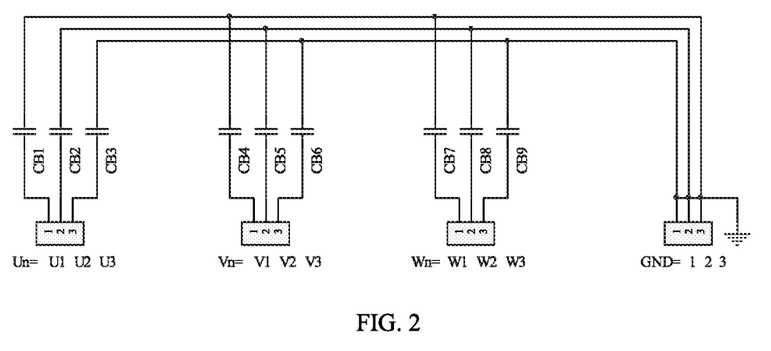
FIG. 2 is a distribution diagram of compensation capacitor banks.
Figure 3:
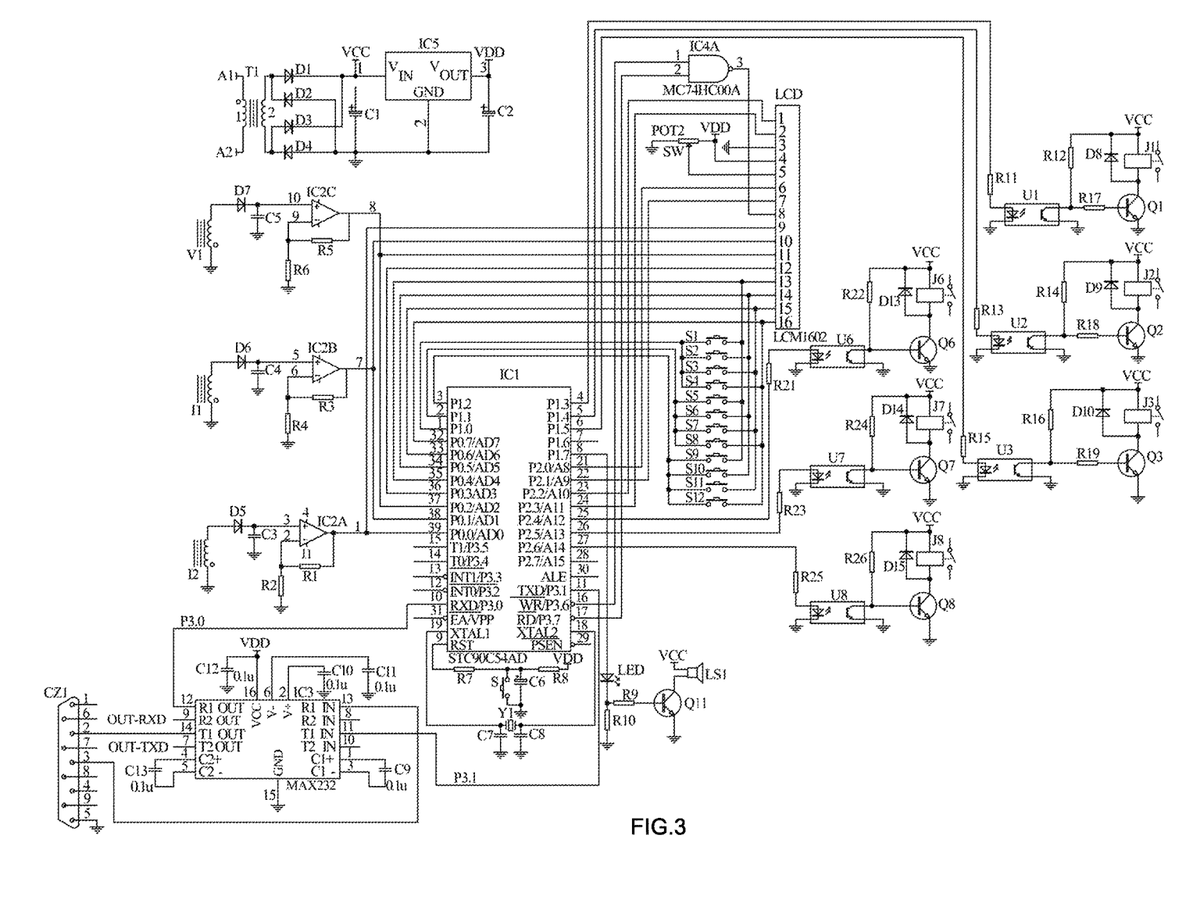
FIG. 3 is an electrical schematic diagram of the intelligent controller.

The intelligent controller of FIG. 2 is a typical single-chip microcomputer control system using a single-chip microcomputer IC1 as the core and consists of a power supply, a display, a keyboard, a communication port, an alarm circuit and a load driving circuit. The IC1 adopts a typical 80C51 series single-chip microcomputer, or other series of single-chip microcomputers with similar performance, which are already internally provided with resources such as an MCU microprocessor, an EEPROM program memory, a SRAM data memory, an A/D converter, an I/O port and a serial communication port. The exterior consists of a regulated power supply, a display, a keyboard, a communication port, an alarm circuit and a load driving circuit.

The load driving circuit of FIG. 2 consists of a two-path photoelectric isolation driving circuit. One path drives three high-power three-phase switching switches M to switch the three stages of series windings of the variable power motor, wherein leading-out terminals of first-stage windings L1 are leading-out terminals U1, V1, W1 of the maximum rated current Ir1 (rated power P1), leading-out terminals of second-stage windings L2 are leading-out terminals U2, V2, W2 of a next-stage rated current Ir2 (rated power P2), and leading-out terminals of third-stage windings L3 are leading-out terminals U3, V3, W3 of the minimum rated current Ir3 (rated power P3), and so on. The other path drives three three-phase compensation capacitor switching switches to realize the combined compensation switching of the three stages of windings of the variable power motor, so as to obtain a higher power factor and better light load power saving effect. The switching switch K may be composed of a contactor, a relay, and an electronic switch.

If necessary, more ports of the IC1 may be used to expand a drive relay circuit so as to obtain more windings n of the multi-winding motor. If multiple stator windings L=5 or multiple stator windings L=6 or even more stator windings are selected, higher smoothness of soft-start and soft-stop and higher light load regulation accuracy will be obtained, but both the number n of switching switches and the number n of terms of a progression need to be adjusted synchronously at this time, and more output ports of the single-chip microcomputer need to be occupied.

A calculation method of power factor compensation is commonly used to calculate a power factor Cos φ phase, and then compare it with a tested Cos φ phase to obtain switching control signals of the other path that drives the three three-phase compensation capacitor switching switches. Current and voltage signals output by current and voltage sensors I1 and V1 in the intelligent controller are output as square wave signals by a comparator and sent to ports P0.2 and P0.1 of the IC1, respectively. A phase difference φ is obtained by detecting a phase current and a phase voltage of a load, and the capacity of the compensation capacitor is selected depending on the reactive power component of the load.

The variable power motor and the intelligent controller access a phase current detection input port and a phase voltage detection input ports P0.1 and P0.2 of the IC1 in an inquiry manner. A time value is counted by a timer/counter T1 inside the CPU, and a phase difference φ is obtained through conversion, and a control algorithm usually adopts the PID algorithm. The intelligent controller issues switching commands of the multiple power factor compensation switching switches K through the output port according to the magnitude and positive and negative of the phase difference φ obtained by operation, and finally the value of the phase difference φ can be controlled to be around an ideal value of 0°. The intelligent controller can also detect and calculate the phase difference φ in an interrupt mode.

P0.4~P0.7 of the IC1 are also respectively connected to S1, S5, S2, S6, S3, S7, S4 and S8 as signal output ends of the keyboard, the keys S1, S2, S3 and S4 are connected to the a port P1.0 of the IC1, and the keys S5, S6, S7 and S8 are connected to a port P1.1 of the IC1. A RXD pin of the IC1 is connected to an R1 OUT pin of an RS232 serial interface chip IC3. A TXD pin of the IC1 is connected to a T1 IN pin of the RS232 serial interface chip IC3. A T1 OUT pin of the RS232 serial interface chip IC3 is connected to a second pin of a serial interface socket CZ1 of the intelligent controller. An R1 IN pin of the RS232 serial interface chip IC3 is connected to a third pin of the serial interface socket CZ1 of the intelligent controller. A fifth pin of the serial interface socket CZ1 is grounded. C2+ and C2− pins of the RS232 serial interface chip IC3 are connected to a ninth capacitor C9. C1+ and C1− pins of the RS232 serial interface chip IC3 are connected to an eighth capacitor C8. V− and V+ pins of the RS232 serial interface chip IC3 are grounded via a tenth and an eleventh capacitors C10 and C11, respectively. A Vcc pin of the RS232 serial interface chip IC3 is connected to a working power supply Vdd.

Pins P1.3, P1.4 and P1.5 of the IC1 are connected to LED anodes of a first, a second and a third optocouplers U1, U2 and U3 through a seventh, a twelfth and a fifteenth resistors R9, R12 and R15, respectively, and LED cathodes of the first, second and third optocouplers U1, U2 and U3 are grounded. Triode collectors of the first photocoupler U1 are connected to the working power supply Vdd and a base of a first triode Q1 via a tenth and an eleventh resistors R10 and R11, respectively. The collector of the first triode Q1 is connected to the working power supply Vdd via a forward seventh diode D7 and a first relay J1. An emitter of the first triode Q1 is grounded.

Triode collectors of the second photocoupler U2 are connected to the working power supply Vdd and a base of the second triode Q2 via a thirteenth and a fourteenth resistors R13 and R14, respectively. The collector of the second triode Q2 is connected to the working power supply Vdd via a forward eighth diode D8 and a second relay J2. An emitter of the second triode Q2 is grounded.

Triode collectors of the third photocoupler U3 are connected to the working power supply Vdd and a base of the third triode Q3 via a sixteenth and a seventeenth resistors R16 and R17, respectively. The collector of the third triode Q3 is connected to the working power supply Vdd via a forward 9th diode D9 and a third relay J3. An emitter of the third triode Q3 is grounded.

If necessary, more ports of the IC1 can be used to expand the drive relay circuit so as to obtain more windings of the multi-winding motor and improve the smoothness of soft-start and soft-stop as well as the light load regulation accuracy.

Figure 4:
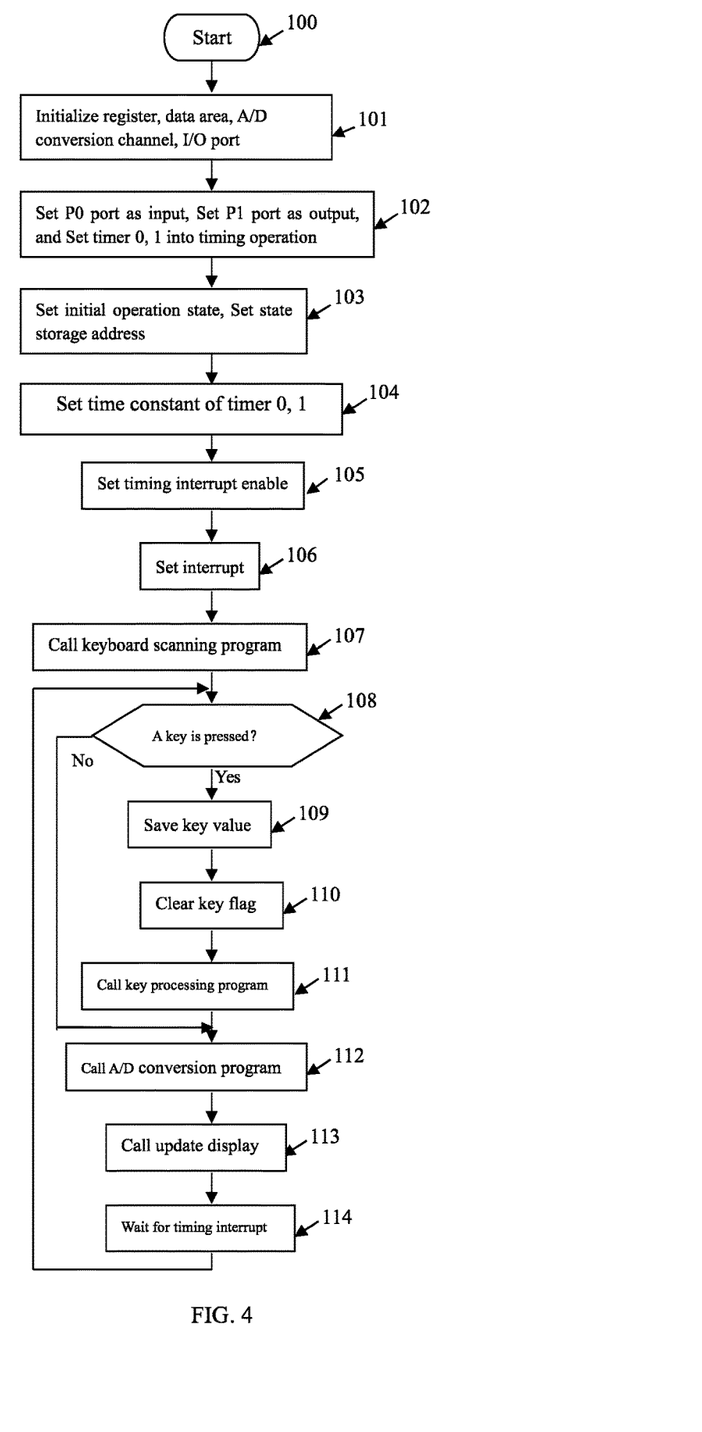
FIG. 4 is a flowchart of a main program.
Figure 5:
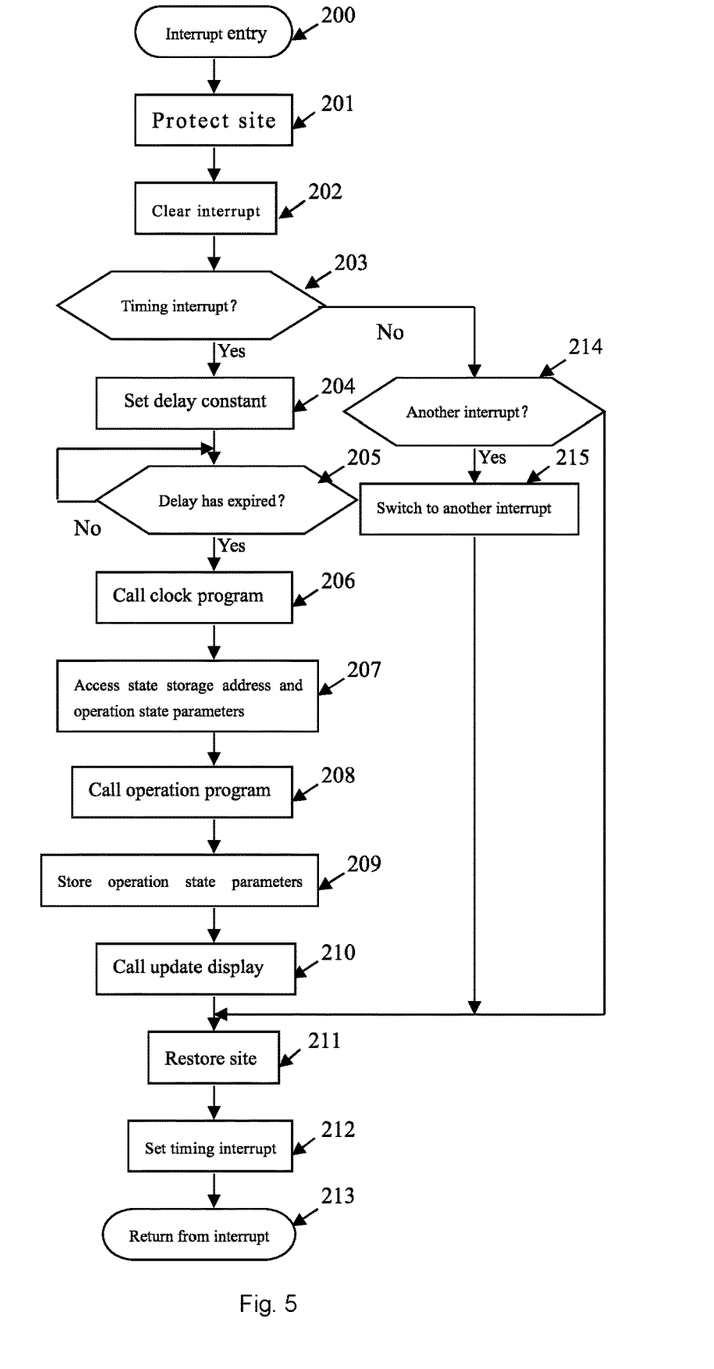
FIG. 5 is a flowchart of an interrupt handling program.
Figure 6:
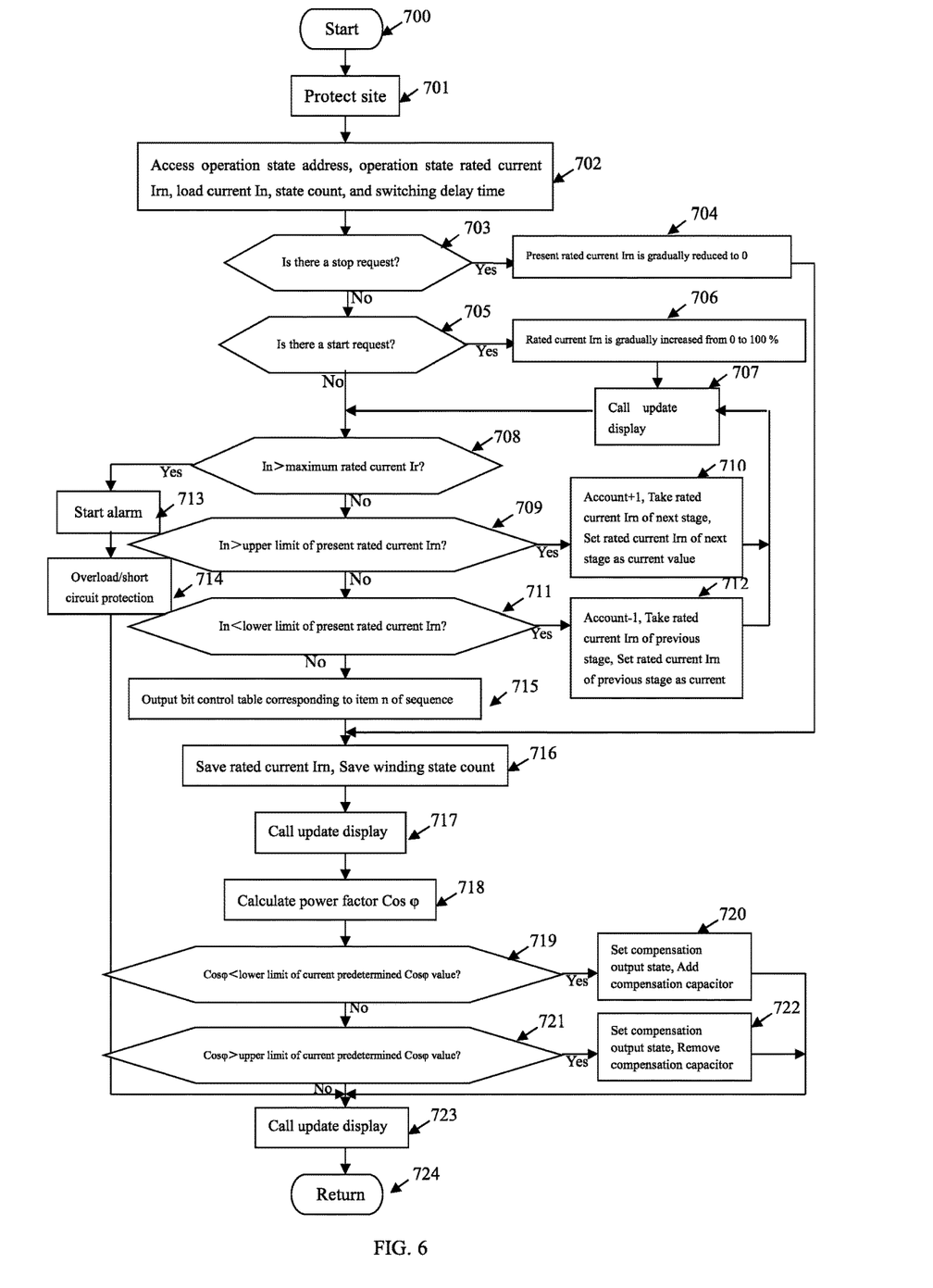
FIG. 6 is a flowchart of an operation control program.

The software programs of the IC1 of intelligent controller mainly include a main program, an interrupt handling program, a keyboard scanning program, an A/D conversion program, an operation control program including soft-start and soft-stop, an update display program, a key handling program and a clock program. FIGS. 4 to 6 illustrate a flow chart of program operation in the program memory of the IC1 of the intelligent controller shown in FIG. 2, respectively. After power-up or reset, the microprocessor automatically starts execution from the main program.

The execution steps of the main program of FIG. 4 are as follows: after starting step 100, step 101 is executed: initializing a register, a data area, an A/D conversion channel, an I/O port, then step 102: setting P0 port as input, setting P1 port as output, and setting timer 1 into timing operation, then step 103: setting an initial operation state, setting a state storage address, then step 104: setting a time constant of the timer 1, then step 105: setting timing interrupt enable, then step 106: setting interrupt, then step 107: calling a keyboard scanning program, then step 108: testing whether a key is pressed? If a key is pressed, then step 109 is executed: saving the key value, then step 110: clearing the key flag, then step 111: calling a key processing program, then step 112: calling the A/D conversion program, then step 113: calling update display, then step 114: waiting for the timing interrupt, and then the process jumps to step 108 to test whether a key is pressed.

If step 108 is executed and no key is pressed, then step 112 is executed directly: calling the A/D conversion program, then step 113: updating the display, then step 114 is executed, and then the process returns to step 108.

The execution steps of the interrupt handling program of FIG. 5 are as follows: after the starting step 200, step 201 is executed: protecting the site, then step 202: clearing interrupt, then step 203: inquiring whether it is a timing interrupt; if it is a timing interrupt, step 204 is executed: setting a delay constant, then step 205: inquiring whether the delay has expired? If the delay has not expired, repeating inquiry and waiting; and if the delay has expired, step 206 is executed: calling the clock program, then step 207: accessing state storage address and operation state parameters, then step 208: calling the operation program, then step 209: storing the operation state parameters, then step 210: calling the update display, then step 211: restoring the site, then step 212: setting timing interrupt, and then step 213: returning from the interrupt.

In step 203, if it is not a timing interrupt after inquiry, then step 214 is executed: inquiring whether it is another interrupt? If it is another interrupt, then step 215 is executed: switching to another interrupt, then step 211: restoring the site, then step 212: setting timing interrupt, and then step 213: returning from the interrupt. In step 214, if it is not another interrupt after inquiry, step 211 is directly executed: restoring the scene, then step 212: setting timing interrupt, and then step 213: returning from the interrupt.

The execution steps of the operation control program of FIG. 6 are as follows: after the starting step 700, step 701 is executed: protecting the site, then step 702: accessing an operation state address, an operation state rated current Irn, a load current In, a state count, and switching delay time, then step 703: testing whether there is a stop request? If there is a stop request, then step 704 is executed: the present rated current Irn is gradually reduced to 0 stage by stage, then the process jumps to step 715: saving the rated current Irn, then step 716: saving the status count, then step 717: calling update the display, and then step 718: return.

In step 703, if there is no stop request, then step 705 is executed: testing whether there is a start request? If there is a start request, then step 706 is executed: the rated current Irn is gradually increased from 0 to 100% stage by stage, then step 707: calling the update display, then step 708: testing whether the load current In is>the maximum rated current Ir? If the load current In is>the maximum rated current Tr, then step 713 is executed: starting the alarm, then step 714: performing overload/short circuit protection processing, then step 717: calling update display, and then step 718: return.

In step 708, if it is tested that the load current In is≯ the maximum rated current Tr, then step 709 is executed: testing whether the load current In is>an upper limit of the present rated current Irn? If the load current In is>the upper limit of the present rated current Irn, then step 710 is executed: increasing the count of the rated current Irn by 1, and taking the rated current Irn of the next stage, then step 707: calling update display, and then the process goes back to step 708: testing whether the load current In is>the maximum rated current Ir?

In step 709, if it is tested that the load current In is≯ the upper limit of the present rated current Irn, then step 711 is executed: testing whether the load current In is<a lower limit of the present rated current Irn? If the load current In is<the lower limit of the present rated current Irn, then the rated current count is increased by 1, and the upper rated current Irn of the previous stage is taken, then step 707 is executed: calling update display, and then the process returns to step 708: testing whether the load current In is>the maximum rated current Ir?

In step 711, if it is tested that the load current In is≮ the lower limit of the present rated current Irn, then step 715 is executed: saving the rated current Irn, then step 716: saving the state count, then step 717: calling update display, and then step 718: return.

What is claimed is:

1. An intelligently-controlled variable power motor, consisting of a variable power motor and an intelligent controller, wherein the variable power motor mainly consists of a rotor, a stator, a housing, stator windings (L) and terminals; the intelligent controller and load current sensors (I1, I2), a voltage sensor (V1), multiple winding switching switches (m) and multiple power factor compensation switches (K) form an automatic control system of the variable power motor; the intelligent controller controls the switching on and off of the for multi-stage winding switching switches (m) and the multiple power factor compensation switches (K) according to a comparison operation of load current and voltage signals of the load current sensors (I1, I2) and the voltage sensor (V1) and motor operation state information and through mathematical analysis optimization; wherein the stator windings of the variable power motor are in the form of series windings whose powers are gradually reduced stage by stage according to the rated current (Ir) of the motor, and series nodes (L1, L2, L3 . . . Ln) of the respective stator series windings (L) are led out to the terminals (U1, V1, W1; U2, V2, W2; U3, V3, W3 . . . Un, Vn, Wn), and then the intelligent controller automatically switches and controls the respective series nodes (L1, L2, L3 . . . Ln) of the multiple stages of series windings (L), (n) being the number of nodes of the series windings; the maximum rated current of the multiple stages of stator series windings (L) is the rated current (Ir) of the motor, i.e. the rated current of the series windings (L1) near the star point, and rated currents (Ir1 to Irn) of respective stator series windings (L) are respectively selected according to geometric progression, arithmetic progression or other discrete parameters of the rated currents (Ir) to complete the optimization of respective rated current (Ir1 to Irn) of the multiple stages of series windings (L); and the stator windings of the variable power motor are formed by embedding multiple stages of stator series windings (L) in the same stator core slot, the multiple stages of stator series windings (L) are connected in segmented series stage by stage from the star point to the outside according to the magnitude of power of the windings, and the windings near the star point are series windings (L1) having the maximum power, the series windings (L1) are each connected at one end to form the so-called star point (o), the other ends of the series windings (L1) are each connected to one end of a respective one of the next-stage series windings with a power only second to the maximum power, while the other ends of the next-stage series windings with a power only second to the maximum power are each connected to one end of a respective one of their next-stage series windings with a power only second to the power thereof, and so on, until open ends of the series windings (Ln) with the minimum power are the leading-out terminals of the minimum power; series nodes of the series windings (L1) with the maximum power near the star point (o) and their next-stage series windings (L2) with the power only second to the maximum power serve as the leading-out terminals of the maximum power, and so on; and then leading-out terminals of the next-stage power only second to the maximum power are led out at the nodes of respective series windings, then the leading-out terminals of the still next-stage power, until the leading-out terminals (Ln) of the open ends of the series windings with the minimum power.

2. The intelligently-controlled variable power motor according to claim 1, wherein leading-out terminals of the respective nodes (L1, L2, L3 . . . Ln) of the multiple stages of stator series windings (L) of the variable power motor of the present invention are respectively led out according to the rated currents (Ir1, Ir2, Ir3 to Irn) of different magnitudes, and the series windings (Ln) with the minimum power are the leading-out terminals of the open ends of the series windings; the rated currents (Irn) or rated powers of the variable power motor led out by respective leading-out terminals can be controlled to increase gradually from small to large by the intelligent controller to realize the soft-start of the motor, and be controlled to decrease gradually from large to small to realize the soft-stop of the motor; appropriate series windings can be switched in real time by the intelligent controller according to the load sensing signal, so that the real variable power motor can automatically change the power regulation characteristics and excellent energy saving effect in tracking the load change, the real-time switching of the appropriate series windings by the variable power motor according to the load can be realized by the intelligent controller by performing a comparison operation according to load sensing signals, thus the variable power motor can realize the regulation characteristic of automatically changing the power in tracking the load change and has excellent power-saving effect; the stator series windings (L) of the variable power motor adopts a multi-stage segmented intelligent control, the nodes of each stage outward from the star point (o) can be each regarded as a three-phase motor with independent power, until a three-phase motor with the minimum power at the open end, and the motor power of each stage is increased by a certain amount from the open end to the center star point (o); and the series windings near the star point (o) are always in working state after the motor is turned on, but the working current of each stage varies with the change of the following stages, until the final windings (Ln) with the minimum power.

3. The intelligently-controlled variable power motor according to claim 1, wherein leading-out terminals of the series nodes of each stage of the three-phase series windings (L) and the next stage of the three-phase series windings correspond respectively to multiple three-phase switching switches (m1 to mn), so that soft-start and soft-stop are realized, and the rated currents (Ir1 to Irn) of the multiple stages of series windings (Ln) are automatically regulated by tracking load changes in operation, thereby obtaining dynamic regulation characteristics; power supply wirings of the multiple stator series windings (L) are led out to terminals, respectively, and the mathematical optimization method of the multiple stator series windings (L) of the variable power motor is suitable for single-phase or multi-phase motors.

4. The intelligently-controlled variable power motor according to claim 1, wherein the multi-stage winding switching switches (m) and the multiple power factor compensation switching switches (K) correspond to the leading-out nodes of the multiple stages of stator series windings (L) one by one, the number of terms of the multiple stages of stator series windings (L) is equal to the number (n) of terms of a progression, the number (n) of the multiple stages of stator series windings (L) is equal to the number of the multiple winding switching switches (m) or the number of the multiple power factor compensation switching switches (K), and therefore, the number (n) of the multiple stages of stator series windings (L) is also the number (n) of the progression, wherein a first-stage stator winding (L1) is a first term (a1) of the progression, a second-stage stator winding (L2) is a second term (a2) of the progression, a third-stage stator winding (L3) is a third term (a3) of the progression, and a n-stage stator winding (Ln) is the last term (an) of the progression.

5. The intelligently-controlled variable power motor according to claim 1, wherein the intelligent controller controls the switching on and off of the multiple winding switching switches (m) through the results of mathematical analysis according to the magnitude of signals of the load current sensor (I2), that is, the magnitude of the load; and the intelligent controller also control the switching on and off of the multiple power factor compensation switching switches (K) according to the power factor obtained by phase comparison operation of signals of the load current sensor (I1) and the voltage sensor (V1) and through the results of mathematical analysis.

6. The intelligently-controlled variable power motor according to claim 1, wherein the intelligently-controlled variable power motor consists of a signal conditioning circuit with a single-chip microcomputer (IC1) as a control core, load current sensors (I1, I2), load voltage sensors (V1), an operating state parameter display, a keyboard, a driving circuit and a communication interface circuit; at least one group controls switching of the multiple winding switching switches (m) according to the current signals of the load current sensors (I1, I2), so that the variable power motor automatically switches to the low-current winding nodes when the load current is small, thereby reducing the magnetic flux density of the motor core and the output power of the motor and saving electric energy; the IC1 of the intelligent controller runs the program according to the load current signal and pre-input rated current and winding parameters of the motor, and issues switching commands of the multiple winding switching switches (m) through an output port after mathematical analysis and data processing, thereby controlling the multiple switching switches (m) to realize the tracking characteristic of the load current and achieve the optimization of the motor efficiency.

7. The intelligently-controlled variable power motor according to claim 1, wherein at least another group switches the multiple power factor compensation switching switch (K) according to the power factor obtained by calculating the phase difference between the current signal of the load current sensor (I1) and the voltage signal of the load voltage sensor (V1); the IC1 runs a software program in its program memory to output optimized switching control signals of the multiple power factor compensation switching switches (K) through mathematical analysis calculation, and then the multiple power factor compensation switching switches (K) complete the switching of the stator winding compensation capacitors of the motor and realize efficient and economical operation, so that the motor always maintains a higher power factor under any load state, thereby obtaining the characteristic of efficient operation of the motor and enabling the motor to always work under high efficiency and high power factor; and the selection of the capacity of the compensation capacitors of the variable power motor depends on the reactive power component of the load.

* * * * *